(12) United States Patent
Sun et al.

(10) Patent No.: US 10,790,714 B2
(45) Date of Patent: Sep. 29, 2020

(54) ROTOR FOR BRUSHLESS ELECTRIC MACHINE AND BRUSHLESS ELECTRIC MACHINE

(71) Applicant: CONTINENTAL AUTOMOTIVE GmbH, Hannover (DE)

(72) Inventors: Tao Sun, Jinghu Zone/Wuhu (CN); Lu Wang, Jiujiang (CN); Xiangguang Cao, Wuhu-Jiujiang (CN)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/322,431

(22) PCT Filed: Jul. 14, 2017

(86) PCT No.: PCT/EP2017/067868
§ 371 (c)(1),
(2) Date: Jan. 31, 2019

(87) PCT Pub. No.: WO2018/024467
PCT Pub. Date: Feb. 8, 2018

(65) Prior Publication Data
US 2019/0190333 A1    Jun. 20, 2019

(30) Foreign Application Priority Data

Aug. 4, 2016  (CN) .......................... 2016 1 0632598
Aug. 4, 2016  (CN) ..................... 2016 2 0838640 U (51) Int. Cl.
*H02K 1/27*    (2006.01)
(52) U.S. Cl.
CPC ......... *H02K 1/2773* (2013.01); *H02K 1/2766* (2013.01)

(58) Field of Classification Search
CPC .......................... H02K 1/2773; H02K 1/2766
USPC ...................................................... 310/156.1
See application file for complete search history.

(56) References Cited

U.S. PATENT DOCUMENTS

| | | | |
|---|---|---|---|
| 2010/0052457 A1* | 3/2010 | Brahmavar | H02K 1/2733 310/156.13 |
| 2013/0278106 A1* | 10/2013 | Kim | H02K 1/2766 310/156.53 |

FOREIGN PATENT DOCUMENTS

| | | |
|---|---|---|
| DE | 1947411 | 4/1971 |
| DE | 10219190 | 11/2003 |
| DE | 102009046716 | 5/2011 |
| DE | 102012022152 | 5/2014 |
| EP | 1309066 | 5/2003 |

(Continued)

*Primary Examiner* — Terrance L Kenerly
(74) *Attorney, Agent, or Firm* — Cozen O'Connor (57) ABSTRACT

A rotor for a brushless electric machine, having: a rotor core; a rotor shaft, installed inside the rotor core; multiple U-shaped holes are formed in the rotor core, each of the U-shaped holes including a first magnet installation hole, a second magnet installation hole and a hardening material filling hole formed by a bottom space of the U-shaped hole. A groove structure is formed on the rotor core forming a first surface of the hardening material filling hole, with the width of a groove opening of the groove structure being smaller than the width of the bottom of the groove. The rotor for a brushless electric machine provided in the present invention has the advantages of low internal magnetic circuit losses and a stable mechanical structure.

16 Claims, 6 Drawing Sheets

(56) References Cited

FOREIGN PATENT DOCUMENTS

WO     WO 2011/057869     5/2011

\* cited by examiner

ROTOR FOR BRUSHLESS ELECTRIC MACHINE AND BRUSHLESS ELECTRIC MACHINE

CROSS REFERENCE TO RELATED APPLICATION

This is a U.S. national stage of application No. PCT/EP2017/067868, filed on Jul. 14, 2017. Priority is claimed on Chinese Application Nos. CN201610632598.5 and CN201620838640.4, Filed: Aug. 4, 2016, the content of which are incorporated herein by reference.

BACKGROUND OF THE INVENTION

1. Field of the Invention

The present invention relates to the field of electric machines, in particular to a rotor for a brushless electric machine and a brushless electric machine.

2. Description of the Prior Art

In the field of brushless electric machines, there is a rotor design called internal permanent magnet, which in fact involves disposing a magnet inside a rotor structure. Such a structure can not only reduce the rotor diameter, but more importantly has a magnetism-concentrating action, increasing air gap magnetic flux density, and facilitates weak magnetic control of the electric machine.

Existing internal permanent magnet rotor designs have the following problems: 1) there are losses in an internal magnetic circuit of the internal permanent magnet, so that the effective magnet torque and magnetoresistive torque will become very small, with a marked drop in performance; 2) once the internal permanent magnet has been installed, instability of the mechanical structure of the rotor will occur during high-speed rotation of the rotor, due to the effect of centrifugal force.

SUMMARY OF THE INVENTION

An object of one aspect of the present invention is to provide a rotor design for a brushless electric machine and a brushless electric machine comprising the rotor design, to solve the problems of excessive internal magnetic circuit losses and unstable mechanical structure which affect existing brushless electric motors with internal permanent magnets and the rotors thereof.

A first aspect of the present invention provides a rotor for a brushless electric machine, comprising: a rotor core; a rotor shaft, installed inside the rotor core; multiple U-shaped holes are formed in the rotor core, each of the U-shaped holes comprising a first magnet installation hole, a second magnet installation hole, and a hardening material filling hole formed by a bottom space of the U-shaped hole, with the hardening material filling hole being connected to the first magnet installation hole and to the second magnet installation hole separately. A groove structure is formed on the rotor core forming a first surface of the hardening material filling hole, with the width of a groove opening of the groove structure being smaller than the width of the bottom of the groove.

Furthermore, an arcuate bridge is formed on the rotor core forming a second surface of the hardening material filling hole, with a bridge hole formed between the arcuate bridge and the rotor core forming the second surface of the hardening material filling hole. The quantity of the arcuate bridges is a plurality, distributed so as to be spaced apart from one another.

Furthermore, a magnet is fitted in the first magnet installation hole and in the second magnet installation hole of each of the U-shaped holes, wherein the magnet is a permanent magnet.

Furthermore, the hardening material filling hole, groove structure and bridge hole are filled with a hardening material in a single piece, wherein the hardening material is an engineering plastic formed by injection molding.

Furthermore, the first magnet installation hole and the second magnet installation hole are rectangular hole structures, and are each located on a line extending in a radial direction of the rotor Furthermore, a through-hole is formed on the rotor core between any adjacent pair of the first magnet installation hole and second magnet installation hole, the through-hole extending in the axial direction of the rotor core and running through the rotor core.

Furthermore, the U-shaped hole runs through the entirety of the rotor core in the axial direction of the rotor core.

Furthermore, the groove structure extends in the axial direction of the rotor core.

Furthermore, the multiple U-shaped holes are uniformly distributed in the circumferential direction of the rotor core.

A second aspect of the present invention provides a brushless electric machine, comprising the rotor according to the first aspect of the present invention.

Compared with the prior art, the rotor for a brushless electric machine and the electric machine comprising the rotor provided in the present invention have the advantages of low internal magnetic circuit losses and a stable mechanical structure.

DESCRIPTION OF THE ACCOMPANYING DRAWINGS

The accompanying drawings, which form part of the present application, are intended to furnish further understanding of the present invention. The schematic embodiments of the present invention and the explanations thereof are intended to explain the present invention, without constituting an inappropriate limitation thereof. Drawings.

PARTICULAR EMBODIMENTS

The rotor for a brushless electric machine and brushless electric machine containing said rotor according to the present invention are described below by embodiments with reference to the accompanying drawings.

As shown in FIGS. 1 to 7, the rotor for a brushless electric machine according to this embodiment comprises: a rotor core 1 and a rotor shaft 2, the rotor shaft 2 being installed inside the rotor core 1; specifically, the rotor shaft 2 is installed in a fixed manner in a shaft hole 13 in the rotor core 1, in order to enable the rotor core 1 to impel the rotor shaft 2 to rotate together with the rotor core. The material of the rotor core 1 is preferably silicon steel.

Figure 1:
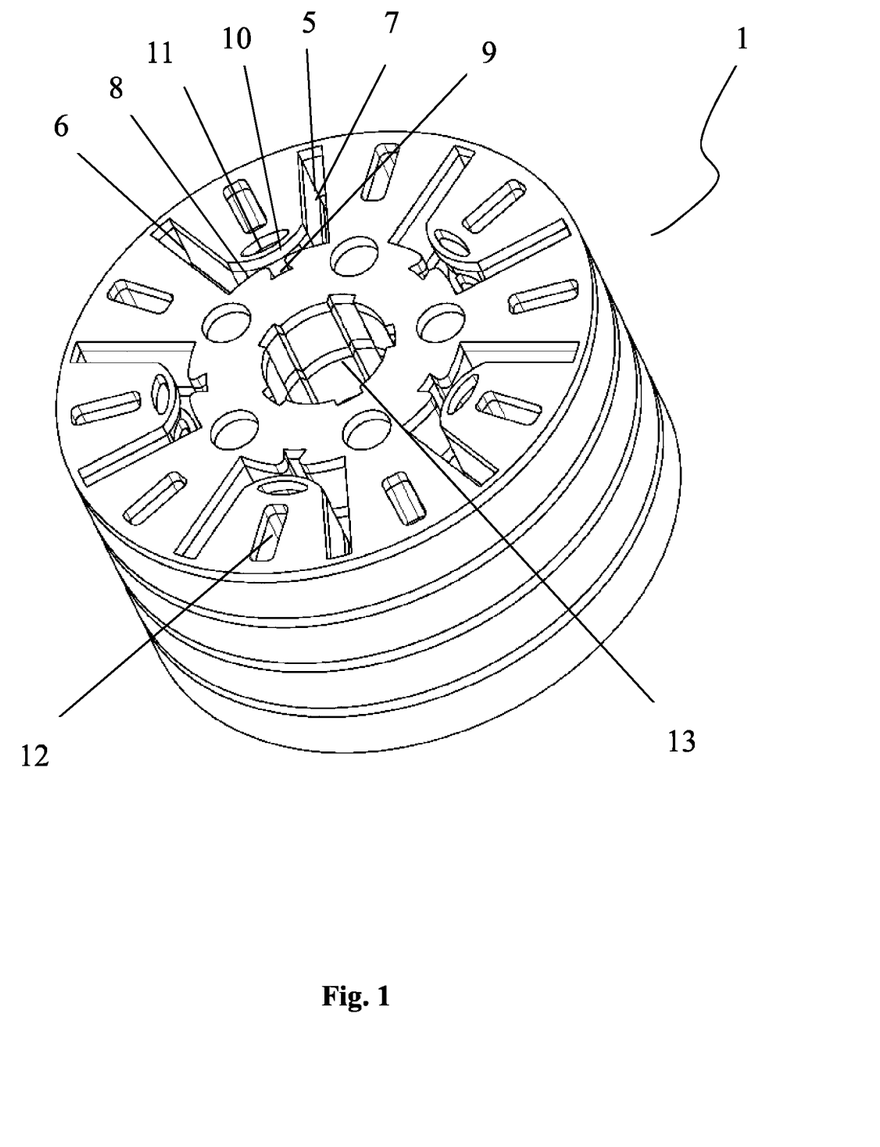
FIG. 1 is a three-dimensional schematic diagram of the rotor.
Figure 2:
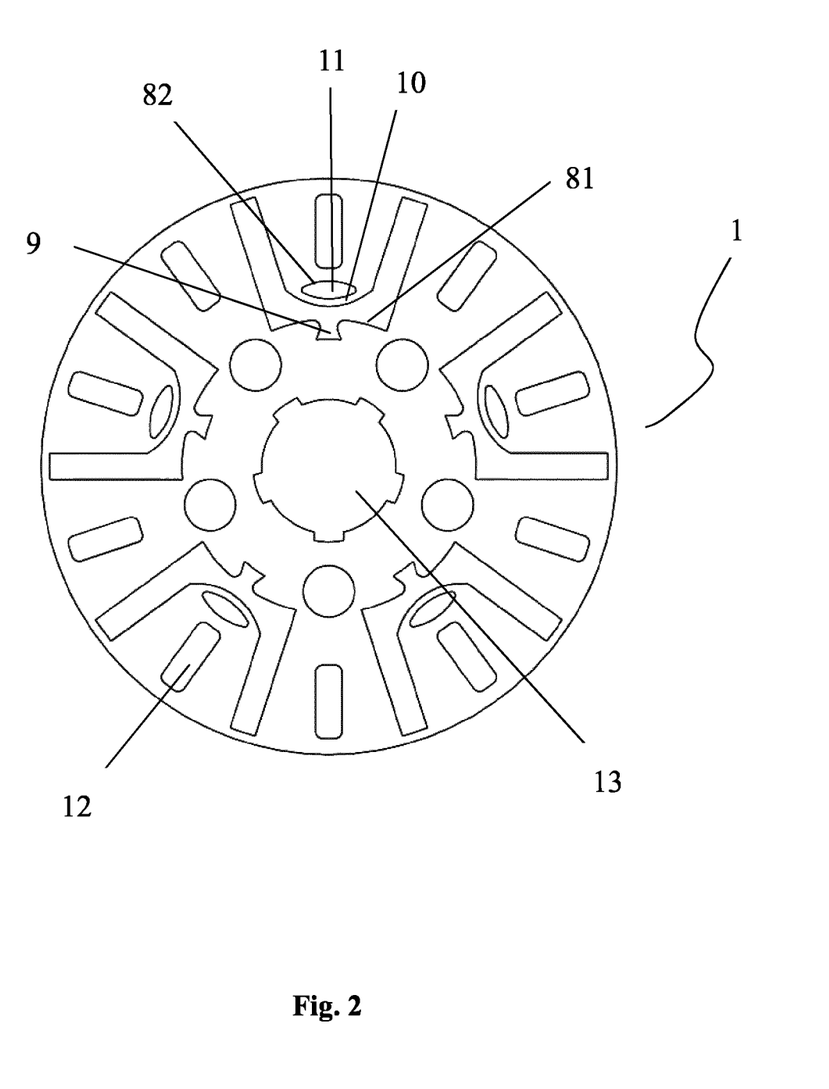
FIG. 2 is a front view of the rotor core shown in FIG. 1.

As shown m FIGS. 1 and 2, m order to fit magnets to realize the function of the rotor, multiple U-shaped holes 5 which have a shape similar to the English letter U, are formed in the rotor core 1. Each of the U-shaped holes 5 comprises a first magnet installation hole 6, a second magnet installation hole 7, and a hardening material filling hole 8 formed by a bottom space of the U-shaped hole 5, with the hardening material filling hole 8 being in communication with the first magnet installation hole 6 and with the second magnet installation hole 7 separately.

Figure 5:
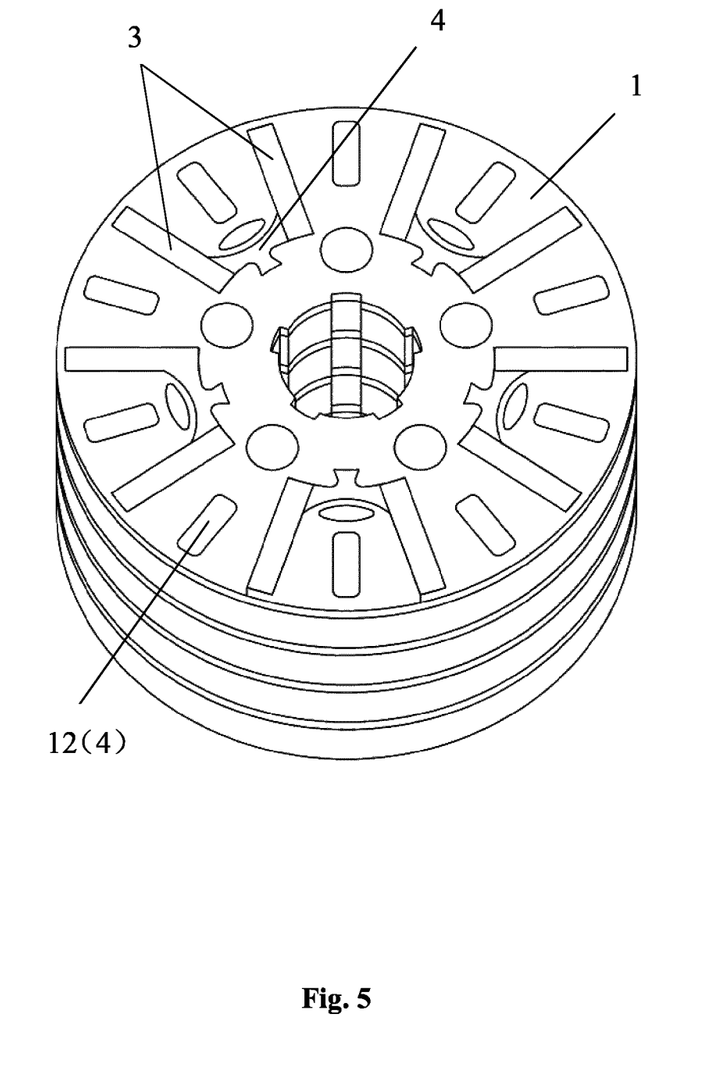
FIG. 5 is a three-dimensional schematic diagram of the rotor core shown in FIG. 1, after fitting magnets and filling with a hardening material.
Figure 6:
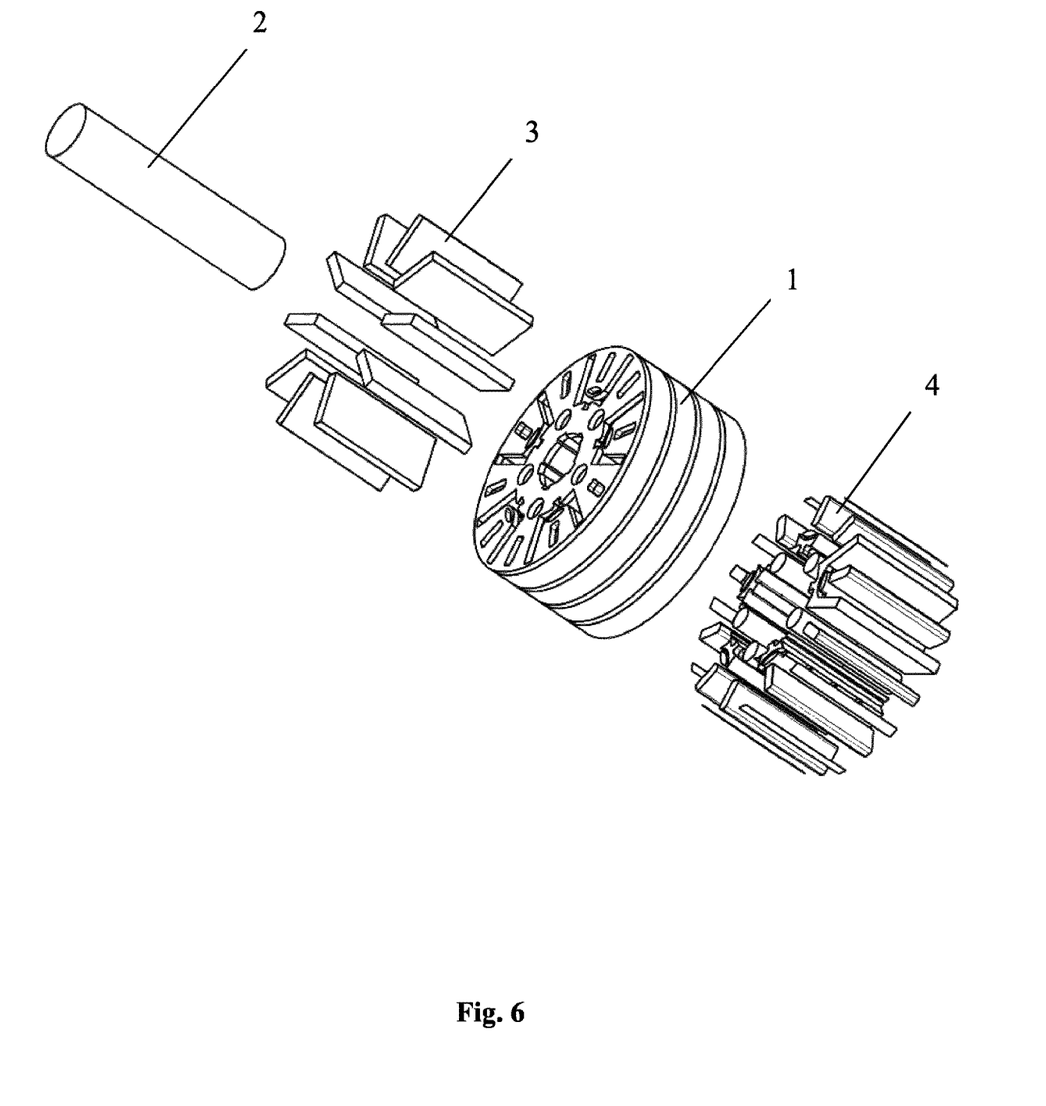
FIG. 6 is an exploded schematic view of a rotor formed by a rotor shaft and the rotor core shown in FIG. 5.
Figure 7:
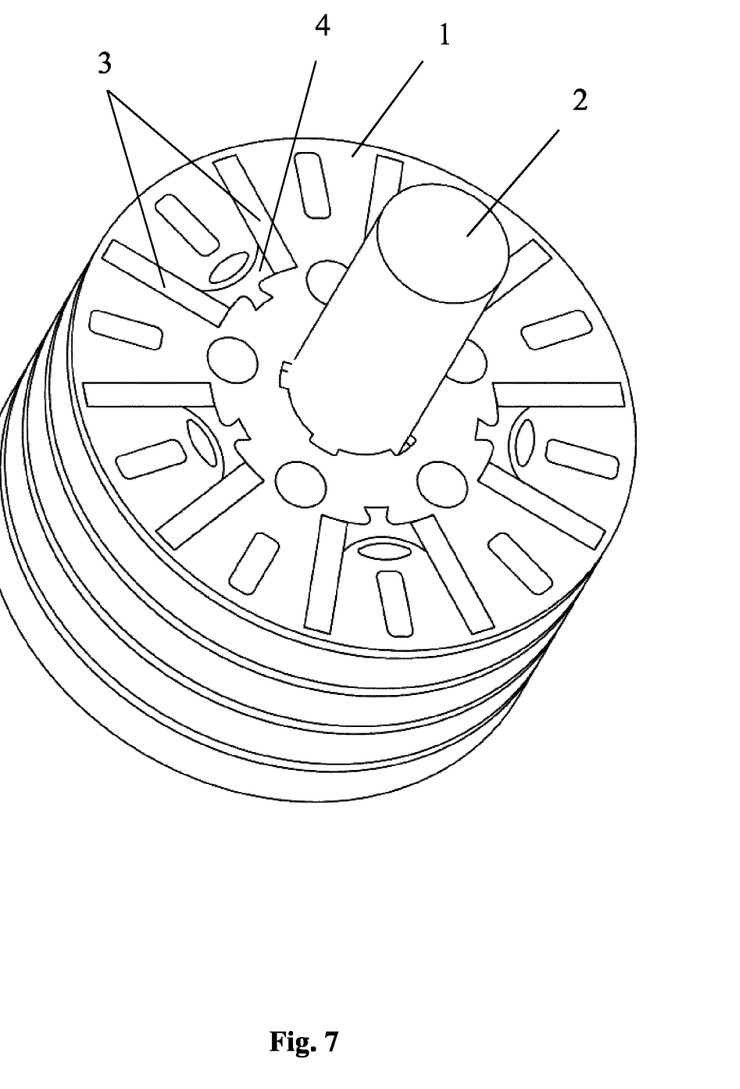
FIG. 7 is a three-dimensional schematic diagram of the rotor shown in FIG. 6 after assembly.

As shown in FIGS. 1, 2, and 5, a respective magnet 3 is fitted internally in both the first magnet installation hole 6 and the second magnet installation hole 7 of each of the U-shaped holes 5, such magnet 3 preferably being a permanent magnet. Preferably, the first magnet installation hole 6 and the second magnet installation hole 7 are rectangular hole structures, and are uniformly distributed in radial directions of the rotor core 1; correspondingly, the magnets 3 disposed internally inside the first magnet installation hole 6 and second magnet installation hole 7 are also rectangular strip-shaped permanent magnets. Such a design, in which the magnets 3 are internally disposed in radial directions in the rotor core 1, can provide an additional magnetoresistive torque to the rotor, and at the same time realize weak magnetic control.

In this case, one function of the hardening material filling hole 8 is as follows: once the magnets 3 have been disposed internally in the first magnet installation hole 6 and the second magnet installation hole 7 of each of the U-shaped holes 5, the hardening material fills hole 8 and blocks the formation of a magnetic field loop between the the first magnet installation hole 6 and the second magnet installation hole 7, thereby considerably reducing energy losses and magnetic circuit depletion in the core inside the rotor.

Figure 3:
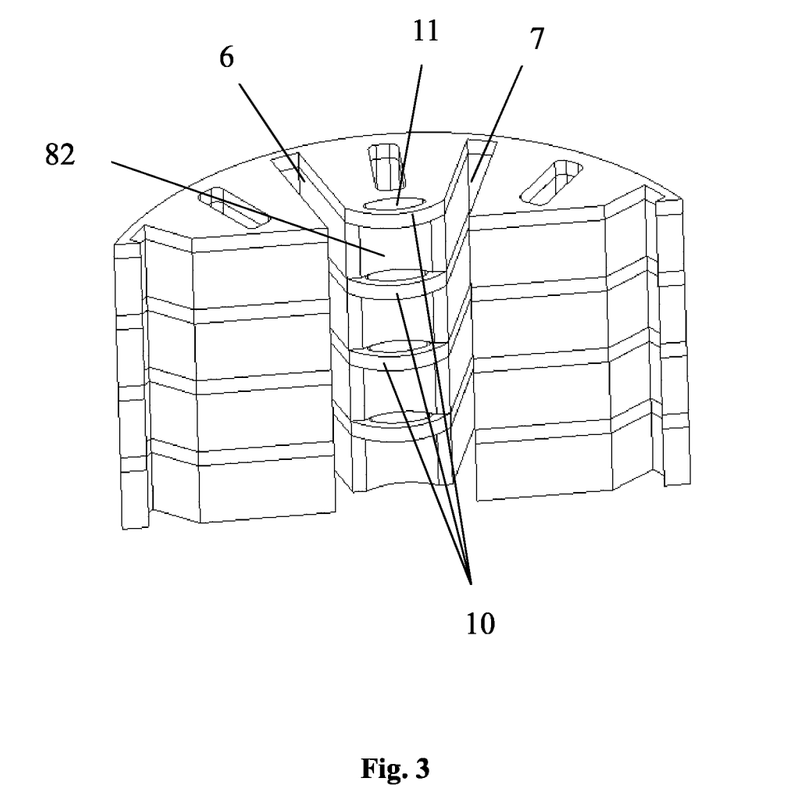
FIG. 3 is a three-dimensional sectional view of the rotor core shown in FIG. 1.
Figure 4:
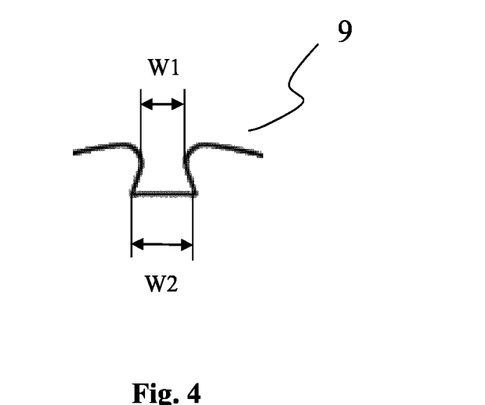
FIG. 4 is an enlarged schematic diagram of the groove structure on the rotor core shown in FIG. 2.

In order to further enhance the reliability of the mechanical structure during high-speed rotation of the rotor core 1, the following structure and method are employed in this embodiment: as shown in FIGS. 1 to 5, a groove structure 9 is formed on the rotor core forming a first surface 81 (a bottom surface of the U-shaped hole 5) of the hardening material filling hole 8; the groove structure 9 is preferably of a shape similar to a dovetail groove, and as shown in FIG. 4, the width W1 of a groove opening is smaller than the width W2 of the bottom of the groove.

Furthermore, an arcuate bridge 10 is formed on the rotor core forming a second surface 82 of the hardening material filling hole 8, with a bridge hole 11 formed between the arcuate bridge 10 and the rotor core forming the second surface 82 of the hardening material filling hole 8. In this embodiment, the quantity of the arcuate bridge (s) 10 may be one or a plurality (as shown in FIGS. 1 and 3, in the case of a plurality, these are distributed on the second surface 82 so as to be spaced apart from one another). Correspondingly, when the quantity of the arcuate bridges 10 is a plurality, there is an equal number of bridge holes 11 corresponding thereto. On the basis of the structure described above, furthermore, as shown in FIG. 5, the hardening material filling hole 8, as well as the groove structure 9 and bridge hole 11 formed therein, are filled or sealed with a hardening material 4 in a single piece; the hardening material 4 is a material with very low permeability, such as an engineering plastic formed by injection molding or a hardened glue. The functions of the structure and hardening material 4 described above are as follows: not only can internal, ineffective magnetic circuit depletion be reduced, but through cooperation between the hardening material and the dovetail-groove-shaped groove structure 9, arcuate bridge 10 and bridge hole 11, the hardening material 4 can stick in the groove structure 9 and covers the arcuate bridge 10 when the rotor is operating, thereby enhancing the reliability of the mechanical structure during high-speed rotation of the rotor.

Preferably, to reduce local saturation of the magnetic circuit, and reduce torque fluctuation when the electric machine is running, as shown in FIGS. 1, 2, and 5, a through-hole 12 is formed on the rotor core between any adjacent pair of the first magnet installation hole 6 and second magnet installation hole 7; preferably, the quantity of the through-holes 12 is a plurality, extending in the axial direction of the rotor core 1 and running through the rotor core 1. Similarly, as FIG. 5 shows, in order to ensure the stability of the mechanical structure, the through-holes 12 may also be filled or sealed with a hardening material.

Preferably, as FIG. 1 shows, each of the U-shaped holes 5 runs through the entirety of the rotor core 1 in the axial direction of the rotor core 1; and the multiple U-shaped holes 5 are uniformly distributed in the circumferential direction of the rotor core 1.

Preferably, as FIG. 1 shows, each of the groove structures 9 extends in the axial direction of the rotor core 1.

This embodiment is a brushless electric machine, comprising a stator, a supporting bearing, an end cover, a printed circuit board and an electrical connector, and also comprising the rotor described in embodiment 1.

Although the present invention has been disclosed above by way of preferred embodiments, the present invention is not limited thereto. Changes and amendments of all kinds made within the spirit and scope of the present invention by any person skilled in the art shall be included in the scope of protection of the present invention. Thus the scope of protection of the present invention shall be the scope defined by the claims.

The invention claimed is:

1. A rotor for a brushless electric machine, comprising:
   a rotor core;
   a rotor shaft arranged in the rotor core;
   a plurality of U-shaped holes are defined by the rotor core, each of the plurality of U-shaped holes comprising:
      a first magnet installation hole;
      a second magnet installation hole; and
      a hardening material filling hole formed by a bottom space of each U-shaped hole, the hardening material filling hole being connected with the first magnet installation hole and with the second magnet installation hole separately;
   a groove structure radially inside the hardening material filling hole formed on the rotor core forming a first surface of the hardening material filling hole, a width of a groove opening of the groove structure being smaller than a width of a bottom of the groove;
   a bridge hole arranged between respective arms of the U-shaped holes and in fluidic communication with the hardening material filling hole; and
   a through hole arranged between the respective arms of the U-shaped holes and radially beyond the bridge hole.

2. The rotor for a brushless electric machine as claimed in claim 1, further comprising:
   an arcuate bridge formed on the rotor core forming a second surface of the hardening material filling hole, with the bridge hole formed between the arcuate bridge and the rotor core forming the second surface of the hardening material filling hole.

3. The rotor for a brushless electric machine as claimed in claim 2, wherein a quantity of arcuate bridges is a plurality of arcuate bridges, which are distributed so as to be spaced apart from one another.

4. The rotor for a brushless electric machine as claimed in claim 1, further comprising: a respective magnet fitted in each of the first magnet installation hole and the second magnet installation hole of each of the plurality of U-shaped holes.

5. The rotor for a brushless electric machine as claimed in claim 4, wherein each magnet is a permanent magnet.

6. The rotor for a brushless electric machine as claimed in claim 1, wherein the first magnet installation hole and the second magnet installation hole are rectangular hole structures, which are each located in a radial direction with respect to the rotor core.

7. The rotor for a brushless electric machine as claimed in claim 1, wherein a through-hole is formed on the rotor core between an adjacent pair of the first magnet installation hole and second magnet installation hole, the through-hole extending in an axial direction of the rotor core and running through the rotor core.

8. The rotor for a brushless electric machine as claimed in claim 1, wherein each U-shaped hole runs through an entirety of the rotor core in an axial direction of the rotor core.

9. The rotor for a brushless electric machine as claimed in claim 1, wherein the groove structure extends in an axial direction of the rotor core.

10. The rotor for a brushless electric machine as claimed in claim 1, wherein the plurality of U-shaped holes are uniformly distributed in a circumferential direction of the rotor core.

11. The rotor for a brushless electric machine as claimed in claim 1, wherein: the rotor core has a substantially constant diameter and uninterrupted outer surface.

12. The rotor for a brushless electric machine as claimed in claim 1, wherein the through hole is fluidically isolated from the bridge hole.

13. The rotor for a brushless electric machine as claimed in claim 1, wherein the groove structure is in fluidic communication with the bridge hole.

14. A rotor for a brushless electric machine, comprising:
a rotor core;
a rotor shaft arranged in the rotor core;
a plurality of U-shaped holes are defined by the rotor core, each of the plurality of U-shaped holes comprising:
a first magnet installation hole;
a second magnet installation hole; and
a hardening material filling hole formed by a bottom space of each U-shaped hole, the hardening material filling hole being connected with the first magnet installation hole and with the second magnet installation hole separately;
a groove structure formed on the rotor core forming a first surface of the hardening material filling hole, a width of a groove opening of the groove structure being smaller than a width of a bottom of the groove; and
an arcuate bridge formed on the rotor core forming a second surface of the hardening material filling hole, with a bridge hole formed between the arcuate bridge and the rotor core forming the second surface of the hardening material filling hole,
wherein the hardening material filling hole, the groove structure, and the bridge hole are filled with a hardening material in a single piece.

15. The rotor for a brushless electric machine as claimed in claim 14, wherein the hardening material is an engineering plastic formed by injection molding.

16. A brushless electric machine, comprising:
a stator;
an end cover;
a supporting bearing;
an electrical connector; and a rotor comprising:
a rotor core;
a rotor shaft arranged in the rotor core;
a plurality of U-shaped holes are defined by the rotor core, each of the plurality of U-shaped holes comprising:
a first magnet installation hole;
a second magnet installation hole; and
a hardening material filling hole formed by a bottom space of each U-shaped hole, the hardening material filling hole being connected with the first magnet installation hole and with the second magnet installation hole separately;
a groove structure radially inside the hardening material filling hole formed on the rotor core forming a first surface of the hardening material filling hole, a width of a groove opening of the groove structure being smaller than a width of a bottom of the groove; and
a bridge hole arranged between respective arms of the U-shaped holes and in fluidic communication with the hardening material filling hole; and
a through hole arranged between the respective arms of the U-shaped holes and radially beyond the bridge hole.

* * * * *